(12) United States Patent
Rossi et al.

(10) Patent No.: US 9,025,595 B2
(45) Date of Patent: May 5, 2015

(54) UNIFIED NETWORK ARCHITECTURE FOR SCALABLE SUPER-CALCULUS SYSTEMS

(75) Inventors: Mauro Rossi, Gemona del Friuli (IT); Giampietro Tecchiolli, Trento (IT); Pierfrancesco Zuccato, Udine (IT)

(73) Assignee: Eurotech SpA, Amaro (IT)

( * ) Notice: Subject to any disclaimer, the term of this patent is extended or adjusted under 35 U.S.C. 154(b) by 179 days.

(21) Appl. No.: 13/988,249

(22) PCT Filed: Nov. 18, 2011

(86) PCT No.: PCT/IB2011/002742
§ 371 (c)(1),
(2), (4) Date: May 17, 2013

(87) PCT Pub. No.: WO2012/066414
PCT Pub. Date: May 24, 2012

(65) Prior Publication Data
US 2013/0239121 A1    Sep. 12, 2013

(30) Foreign Application Priority Data
Nov. 19, 2010    (IT) .............................. UD2010A0210

(51) Int. Cl.
G06F 9/54    (2006.01)
G06F 9/46    (2006.01)
G06F 15/173    (2006.01)

(52) U.S. Cl.
CPC ............ *G06F 9/54* (2013.01); *G06F 15/17337* (2013.01); *G06F 15/17343* (2013.01); *G06F 15/17356* (2013.01)

(58) Field of Classification Search
CPC ................... G06F 15/17337; G06F 15/17343; G06F 15/17356; G06F 9/54; H04L 49/15
USPC .................. 370/351, 357, 360, 386; 709/223; 718/100, 102, 106
See application file for complete search history.

(56) References Cited

U.S. PATENT DOCUMENTS 7,761,687 B2    7/2010  Blumrich et al.
2004/0117519 A1    6/2004  Smith
(Continued)

OTHER PUBLICATIONS

Jiazheng Zhou et al., "Hardware Supported Multicast in Fat-Tree-Based InfiniBand Networks", The Journal of Supercomputing, Kluwer Academic Publishers, BO, vol. 40, No. 3, Mar. 16, 2007.
(Continued)

*Primary Examiner* — Chi H Pham
*Assistant Examiner* — Robert Lopata
(74) *Attorney, Agent, or Firm* — Rankin, Hill & Clark LLP

(57) ABSTRACT

A network architecture is used for the communication between elementary calculus units or nodes of a supercomputer to execute a super-calculus processing application, partitionable and scalable at the level of calculus power in the range of PetaFLOPS. The supercomputer comprises a plurality of modular structures, each of which comprises a plurality of elementary calculus units or nodes defined by node cards a backplane, a root card, and a node communication network of the switched fabric fat tree type; ii) a synchronization architecture comprising a plurality of distinct node communication networks, configured for the communication of specific synchronization information different from network to network and with different characteristics; iii) a re-configurable Programmable Network Processor that implements the nodes both of the n-toroidal network and those of the synchronization networks.

The node communication networks of the n-toroidal type and of the switched fabric fat tree type can be used alternately or simultaneously for the transmission between the calculus nodes of the same type of data and information also in a configuration of system partitions in order to achieve the desired interconnection topology of the nodes.

13 Claims, 8 Drawing Sheets

(56) References Cited

U.S. PATENT DOCUMENTS

2005/0044195 A1\* 2/2005 Westfall .................. 709/223
2005/0105515 A1\* 5/2005 Reed et al. ................ 370/360
2009/0006808 A1\* 1/2009 Blumrich et al. ........... 712/12
2009/0259713 A1 10/2009 Blumrich et al.
2009/0300752 A1\* 12/2009 Barsness et al. ............ 726/15
2010/0186019 A1\* 7/2010 Branson et al. ............ 718/104
2014/0153399 A1\* 6/2014 Song ..................... 370/238
2014/0258689 A1\* 9/2014 Song ..................... 712/221

OTHER PUBLICATIONS

International Search Report of PCT/IB2011/002742 dated Mar. 5, 2012.

\* cited by examiner

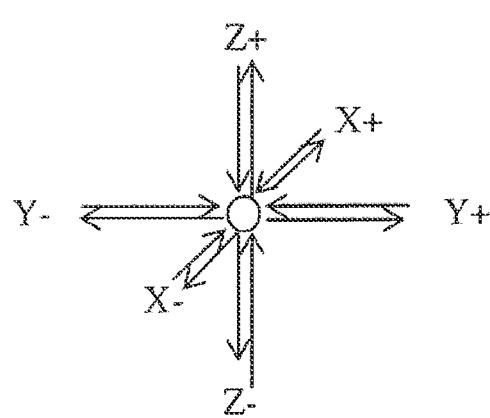
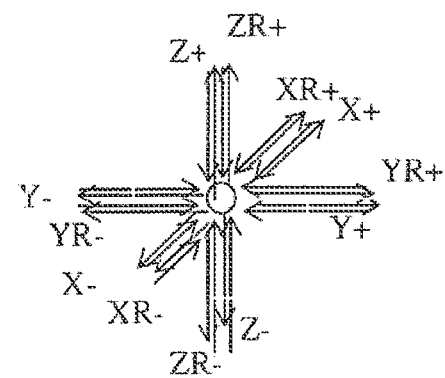
Fig. 11     Fig. 12
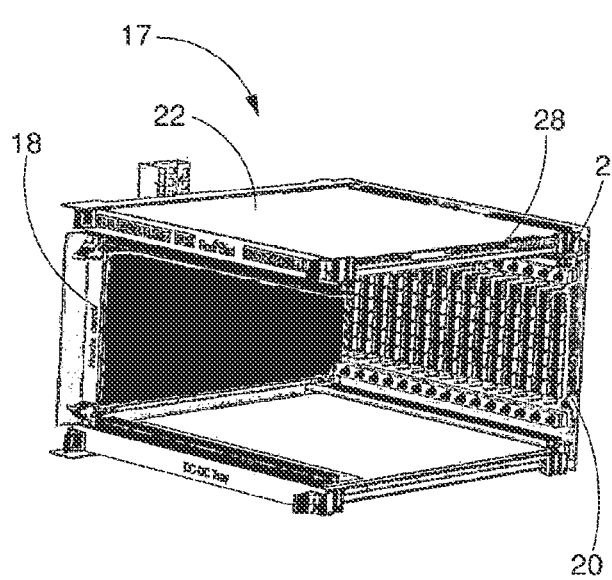
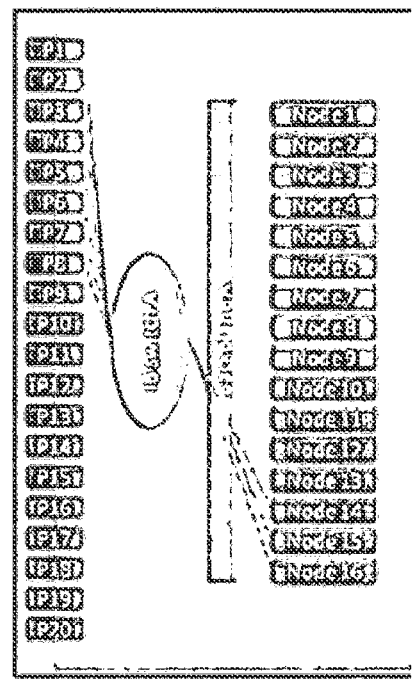
Fig. 13
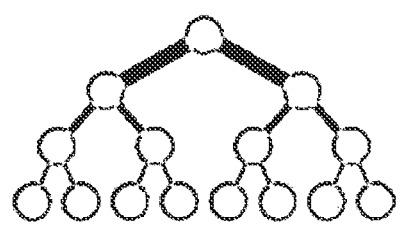
Fig. 14

UNIFIED NETWORK ARCHITECTURE FOR SCALABLE SUPER-CALCULUS SYSTEMS

FIELD OF THE INVENTION

The present invention concerns a unified network architecture for scalable super-calculus systems on levels of computational capacity higher than 1 Petaflops, that is, for high capacity processing systems, or supercomputer, (hereafter HPC—High Performance Computer), used in various applicational field of intensive calculus, such as for example in the field of quantum chromodynamic physics, in fluid-thermodynamic simulations or in other calculus scenarios where high processing capacities are required.

The network architecture according to the present invention can be used for communication between different processing units or calculus nodes, which are part of the processing system.

In particular, the architecture according to the present invention has a communication topology between the nodes of the three-dimensional type with toroidal closing, endowed with higher flexibility, reconfigurability and partitionability and low communication latency.

BACKGROUND OF THE INVENTION

It is known that in the field of application of super-calculus processing, supercomputers are used, comprising a plurality of processing units, or calculus nodes, made on specific electronic cards and grouped together in different containing racks. The overall processing required by the application is distributed in a coordinated manner to the individual calculus nodes which therefore execute a sub-set of operations required by the application. Each processing unit effects a predefined set of calculus and processing operations. The processing units are connected to each other by means of a communication apparatus so that they are able to receive data at input to be processed and can transmit at output, to one or more processing units, the output data relating to the results of the processing.

This allows to distribute the processing among several processing units, to effect different processing tasks substantially simultaneously and to share the relative results among several processing units, optimizing the use of the processing capacity of the supercomputer.

Modern systems of parallel calculus are evolving in overall calculus power in the range of the Petaflop ($10^{15}$ operations per second) with the use of an extremely high number of single calculus units (1-10 k) for installation. These sizes entail problems of various types with managing the whole system, in particular:

efficient synchronization of all the tasks relating to an application performed in parallel on various calculus nodes; as the installation sizes grow, there is a reduction in performance due to the mainly scheduling activities and I/O of the Operating System (OS jitter);

debugging of the applications written specifically for these systems: the great use of parallelism distributed on the various nodes requires instruments able to interact quickly on the system to identify and isolate possible sources of error;

efficient and flexible management of the system calculus power: simultaneous allocation of calculus power for different applications in the same machine so as to maximize exploitation of the installation;

possibility of configuring in different topologies the interconnections between the nodes of the system: some scientific problems are managed with greater efficiency using regular topologies of the 2 or 3 dimensional toroidal type (problems represented by regular patterns of points-nodes with characteristics of locality) whereas other models require less regular interconnection structures (problems related to patterns of points that are more irregular and more distant from each other, for example in problems of Molecular Dynamics) where star type or tree type topologies are more efficient.

HPC calculus systems are known, partitionable with external cabling or with reconfigurations of internal connections in calculus sub-systems with equivalent performances and isolated from each other, in order to execute different applications.

In particular, to improve the performance and overall calculus speed, supercomputers have a communication apparatus that directly connects the processing units to each other, by means of connection cables of a predetermined length. By connecting the calculus nodes directly the transfer latency is reduced to a minimum, that is, the time that has to be waited so that a data packet is transferred from one calculus node to another.

In this case, given that there can be hundreds or even thousands of processing units in a supercomputer, and that it is not physically possible to make a direct connection between all the processing units, particular connection topologies are made in which each of the processing units is physically connected to the "first nearest" nodes, that is, to another four or six adjacent processing units or nodes, in the first case obtaining a two-dimensional connection topology whereas in the second case the connection topology is the three-dimensional type (FIG. 1).

The processing units at the external extremes of the topology, that is, those that do not have a processing unit physically adjacent to close the complete connection, are in turn reciprocally connected, so as to close the respective connections on "first nearest" and achieve, for example in the case of a three-dimensional topology, a "3D toroidal" network architecture (FIG. 2).

These connection topologies to the first nearest allow to obtain excellent processing performance, especially in some specific fields of calculus application such as quantum chromodynamic physics, in fluid-dynamic simulations or others, with respect to a bus connection between the different processing units.

The connections between one processing unit or calculus node and an adjacent processing unit, or first nearest, normally provide an output connection or link and an input connection or link, both unidirectional, or the use of a bidirectional link.

These connection topologies to the first nearest also provide auxiliary connections or links to different processing units so as to increase for each processing unit the possible number of first nearest nodes, usable as alternatives. The auxiliary connections are activated selectively, excluding a corresponding main connection, according to specific commands received from a management entity of the supercomputer, so as to partition dynamically the number of processing units collaborating to effect one or more specific calculus tasks. The partitioning can be defined before the applications are executed, or in real time as a function of the needs of the algorithm.

It is known to use a network that is physically distinct from the node-to-node calculus data and information communication network, used to manage specific synchronism information between the various parallel sub-tasks of an application.

In particular, global synchronization networks for HPC systems are known, used to distribute synchronization information with minimum latency to the whole system or partition.

This is the case, for example, of signals to support collective synchronization operations such as barriers and allwait, which impose on all processes of an application to be put on standby until all the other processes reach a determinate processing point. The support to accelerate the management and transmission of this information, or for the management of global fault signals, consists in the capacity of each node in the network to execute AND type operations on the synchronization signals in transit.

Other global synchronization signals can be to support information of global events: in this case each node of the network has to perform OR type operations on the signals in transit.

It is possible to use this network to distribute signals used as global clocks by the system. Operations for debugging applications can also use this network to manage high priority global signals.

In particular, the coordination of the specific calculus tasks of the processing units of one or more partitions is managed by the synchronization network that allows to coordinate the processing units or nodes together, which belong to the same topological grid.

The synchronization network may include a daisy chain topology, that is, from node to node, a tree or star topology, or mixed, or a connection topology of the first nearest type, for example toroidal. It is important that in the synchronization network the latency is guaranteed constant, within a certain range, for every partitioning made.

The interconnections discussed are made in hardware, therefore by means of conductor tracks inside the printed circuits, connectors, cables etc.

Given that in a supercomputer there are hundreds or thousands of nodes, it is unthinkable to modify the interconnections as above in order, for example, to introduce a different topology, or to make two smaller sub-topologies (or partitions), each closed toroidally. However, in many cases this is desirable because it allows to have several supercomputers with a lower calculus capacity (independent and interconnected for example two/three-dimensionally with toroid closure) able to exploit to the maximum the overall calculus power. Networks known as "collective networks" are also known, specifically made to manage "collective" operations that require coordination of all the nodes involved in a specific processing. For example, in the case of so-called global reduction operations (Allreduce function according to MPI standard—Message Passing Interface) which require to return to a specific node the result of an operation made in parallel on a multitude of nodes, the collective network manages the transit of all the partial results of the processing and, where possible, processes the results (typically summing them) reducing the overall traffic on the network and avoiding congesting the node receiving all the messages from the transmitting processing nodes. Another operation, symmetrical to the reduction operation, is the broadcast operation, with which one datum is distributed to several nodes through parallel processing.

Optimizing the communication of this information in the network requires hardware to support the execution of simple arithmetical operations by every node in the network (for example AND, OR, XOR, whole sum, subtraction, max, min, . . . ) on the messages in transit.

The U.S. Pat. No. 7,761,687 (U.S. Pat. No. '687) is known, and describes an IBM supercomputer architecture called BlueGene, which comprises the physical networks of internal connectivity between the nodes of the system, formed by:

a single node connection network for data communication between the nodes and a toroid topology with an arbitrary number of other nodes, interconnecting all the nodes;

a collective network to manage operations of a collective type between the nodes of the toroidal network pertaining to a processing, such as global reduction operations, broadcast, point-to-point message service or under-tree for input/output, work load programming, system management, monitoring of parallel tasks and debug, so that the "services" or input/output nodes are isolated from the individual node communication network of the n-toroidal type, not interfering with the parallel computation;

"Global Asynchronous network" to supply all the nodes of the system with global synchronism information such as barriers and interrupt distribution (or other notification info).

Application US-A-2009/0259713 (U.S. Pat. No. '713) discloses an analogous supercomputer architecture, again IBM, that comprises:

a single node communication network of the n-toroidal type;

a global tree network, with the same functions as the collective network in U.S. Pat. No. '687;

a "Global Asynchronous network" to supply all the nodes of the system with global synchronism information.

Consequently, both U.S. Pat. No. '687 and U.S. Pat. No. '713 use a single node communication network of the n-toroidal type for communicating data and information between the calculus nodes. However, this solution renders these architectures rigid in terms of flexibility of the interconnection topological configurations between the nodes that can be achieved.

The international project QPACE (http:en.wikepedia.org/wiki/QPACE) is also known, which describes an architecture formed by:

a Network Processor (NWP) made with an FPGA component that implements communication between the nodes in a 3D-toroidal connection;

use of a dedicated global synchronization network ("Global Signal Network") with a tree topology for the rapid distribution of synchronism information to the whole system, and synchronization of the nodes.

Purpose of the present invention is to obtain a communication apparatus for an HPC that defines a scalable network architecture with an extremely high number of calculus units and performances in the range of PetaFLOPS:

flexible configurable in different topologies (n-toroidal, fat tree, hybrid) and partitions of these;

scalable with constant latency in the range of a few microseconds in node-to-node communication for every configuration chosen;

able to reduce the use of the processing units for synchronization operations and other activities not directly connected to the processing (I/O, monitoring, debug, . . . );

able to obtain specific synchronization conditions depending on the algorithm executed or the execution step;

able to decide synchronization conditions for one processing node as a function of all the synchronism information pertaining to the node.

The Applicant has devised, tested and embodied the present invention to overcome the shortcomings of the state of the art and to obtain these and other purposes and advantages.

Unless otherwise defined, all the technical and scientific terms used here and hereafter have the same meaning as commonly understood by a person with ordinary experience in the field of the art to which the present invention belongs. In the event of conflict, the present application shall prevail, including its definitions.

SUMMARY OF THE INVENTION

The present invention is set forth and characterized in the independent claims, while the dependent claims describe other characteristics of the invention or variants to the main inventive idea.

In accordance with the above purpose, a network architecture according to the present invention is used to communicate between elementary calculus units or nodes of a supercomputer in order to execute a super-calculus processing application, partitionable and scalable on the level of the calculus power in the range of PetaFLOPS. The supercomputer associated with the architecture according to the present invention typically comprises a plurality of modular structures, hereafter also called semi-subracks, generally organized in subracks, and racks, each of which comprises:

a plurality of elementary calculus units or nodes defined by node cards, which represent the basic components which implement the calculus and network functions relating to a calculus unit or node of the architecture, wherein the overall processing required by the application is mapped on a determinate partition of the nodes and distributed in coordinated manner to the individual nodes, each of which is configured to execute a process or sub-set of operations required by the application;

a backplane both of interconnection between the nodes of the modular structure and also of communication of the nodes with the other modular structures;

a root card, which manages feed and provides to monitor and distribute synchronization information both between the nodes interconnected by the relative backplane and also toward the other modular structures.

The architecture according to the present invention comprises:

an internodal communication architecture, configured to receive data and information to be processed at input to said nodes and for transmission at output, to one or more other nodes that belong to the mapped application on the desired partition of the modular structure, of output data relating to the results of the processing, so as to at least distribute the processing between several nodes, to effect different processing tasks substantially simultaneously and to share the relative results, also partial results that are then collected and incorporated, among several nodes, wherein the communication architecture comprises a node communication network of the n-toroidal type and a node communication network of the switched fabric fat tree type;

a synchronization architecture comprising a plurality of distinct node communication networks, configured for the communication of specific synchronization information different from network to network and with different characteristics;

a re-configurable Programmable Network Processor that is suitable to implement the nodes both of the n-toroidal network and also those of the synchronization networks.

The node communication networks of the n-toroidal type and the switched fabric fat tree type are usable alternately or simultaneously for transmission of data and information between calculus nodes of the same type, also in configuration as partitions of the system for achieving the desired node interconnection topology.

Furthermore, according to the present invention, the synchronization networks are usable independently or collaboratively for each topology and partitioning of the system.

Furthermore, according to the present invention, the Programmable Network Processor of each node implements the calculus operations necessary for processing the data in transit on the synchronization networks in order to reduce the network traffic and latency.

Furthermore, the Programmable Network Processor is also configurable in real time, during the execution of an application, to achieve a particular partitioning of the system at a certain instant.

The architecture according to the present invention achieves an architecture able to supply a flexible network interconnection as above (n-toroidal, fat tree, mixed), guaranteeing that the system is scalable for computational capacity in the range of PetaFLOPS.

To this purpose, the present invention provides that the synchronization architecture of the system is intelligent, flexible and scalable, able to unload the computation nodes (the respective CPUs which make it up) from different operations and to guarantee an acceptable degree of latency in the synchronization between the processes of the nodes of the system whatever its size may be.

If we compare the architecture according to the present invention with the state of the art U.S. Pat. No. '687, U.S. Pat. No. '713 and Qpace, we find the following advantages of the present invention.

With regard to the topology that can be achieved of the communication network for data and information to be processed:

U.S. Pat. No. '687 and U.S. Pat. No. '713 provide exclusively a configurable n-dimensional toroid and partitions with this structure. In particular, the solution described in detail is a 3D toroid with connection to the first nearest;

QPACE provides an n-dimensional toroid, n less than 4 and partitions with this structure, connection to the first nearest;

the present invention provides:

an n-dimensional toroid, in some embodiments with n less than 4, connection to the first nearest, configurable and partitions of this topology;

topology similar to a fat tree structure (this type of network typology is possible for switched fabric networks, using standard Infiniband) and partitions of this type;

mixed topologies of toroidal partitions and independent fat trees;

topology consisting of toroidal partitions (sub-toroids) connected to each other on a fat tree network in a cluster structure;

n-dimensional toroid topology (n less than 4) on a switched network fabric fat tree (toroidal hardware topology provided and internal synchronization network with dedicated toroid topology);

n-dimensional toroid custom topology (n less than 4) on switched network fabric fat tree (not provided by integrated redundant 3D toroid architecture).

The present invention consequently allows multiple topologies of partitions coexisting simultaneously and, depending on the case, reconfigurable completely by software or by intervening on the cables.

With regard to the support of synchronization operations for threads, operating system and debug and monitoring functions:

U.S. Pat. No. '687 and U.S. Pat. No. '713 provide two specific networks: the first indicated as "High speed low latency collective network", parallel bus type, the second indicated as "low latency global asynchronous signal network" having a serial data bus. The topology is the same for both (binary-tree or similar);

QPACE provides a single specific network: "Global Signal tree" to manage global synchronization activities;

the present invention provides, in some embodiments, three independent dedicated networks with different characteristics to cover requirements of different configurations and topologies.

Consequently, the present invention offers more and diversified hardware supports for synchronization compared with the state of the art.

With regard to the synchronization network for collective operations for calculus nodes in toroidal topology:

U.S. Pat. No. '687 and U.S. Pat. No. '713 provide a collective network low latency or Global tree network mainly for global broadcast and global reduce operations, but also used for completely different operations (I/O, program loading, system management, jobs monitoring, debug). All the processing for collective operations are implemented by one or more calculus units of the node temporarily used for message passing and specific hardware support for operations of AND, OR, XOR and broadcast, whole sum, subtraction, max, min;

QPACE does not provide a synchronization network of the kind;

the present invention, in some embodiments, provides a collective operations support implemented in hardware by a Programmable Network Processor (expandable, reconfigurable in real time) and a rapid dedicated "serial node-to-node" synchronization network with topology and partionability identical to that of the toroidal 3D data network.

Therefore, the present invention provides a specific dedicated hardware support with a dedicated physical network and operations for collectives implemented in FPGA (computation unit not involved).

With regard to the global synchronizations communication network:

U.S. Pat. No. '687 and U.S. Pat. No. '713 provide a global asynchronous signal network, that is, an auxiliary network to a collective network; the topology is binary-treelike, identical to that of the collective network (same node communication);

QPACE provides a global signal tree network used for all synchronization operations and collectives (since it is the only specific network available); the structure is 2 bit, the serial interface is differential in direction, the topology is tree-like with a star structure for the terminal level of the tree;

the present invention provides, in some embodiments, a fast sync global network, which is dedicated, with a topology not constrained by the nodal communication topology or other synchronization networks.

In relation to other known synchronization networks, the present invention provides, in some embodiments, a slow complex sync network. This is of the serial type with an SPI protocol for sending more structured synchronization messages and for offloading from the CPUs communication protocols not intended for processing. The present invention provides a dedicated synchronization network that is independent of the node communication topology and partitioning. The messages intended for this network in the two implementations analyzed in the state of the art are managed, instead, by the other networks seen, increasing the network traffic and using processing resources.

The present invention also concerns a method for making a network architecture for communication between the calculus nodes of a supercomputer in order to execute a super-calculus processing application, partitionable and scalable at the level of calculus power in the range of PetaFLOPS, wherein the overall processing required by the application is mapped on a determinate partition of the nodes and distributed in coordinated manner to the individual nodes, each of which is configured to execute a process or sub-set of operations required by the application, which provides i) to receive, by means of a node communication network of the n-toroidal type and/or a node communication network of the switched fabric fat tree type, data and information to be processed at input to the nodes and for transmission at output, to one or more other nodes that belong to the mapped application on the desired partition of the architecture, of output data relating to the results of the processing, so as to at least distribute the processing between several nodes, to effect different processing tasks substantially simultaneously and to share the relative results among several nodes, ii) to communicate specific synchronization information by means of a synchronization architecture comprising a plurality of distinct node communication networks, wherein different synchronization information having different specific characteristics from network to network use the synchronization networks and are suitably mapped on a selected and suitable one of the synchronization networks;

iii) to implement the nodes both of the n-toroidal network and of the synchronization networks by means of a re-configurable Programmable Network Processor;

wherein:

the node communication networks of the n-toroidal type and of the switched fabric fat tree type are used alternately or simultaneously for the transmission of data and information between calculus nodes of the same type also in a configuration of system partitions in order to achieve the interconnection topology of the nodes;

the synchronization networks are used independently or collaboratively for every topology and partitioning of the system;

the Programmable Network Processor of each node implements the calculus operations necessary to process the data in transit on the synchronization architecture networks in order to reduce the network traffic and the latency.

Furthermore, the Programmable Network Processor is also configurable in real time, during the execution of an application, in order to achieve a particular system partitioning at a certain instant.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 11 is a schematic representation of the data-links for each node of the architecture according to the present invention;

FIG. 12 is a schematic representation of the data-links, main and alternative, for each node of the architecture according to the present invention;

FIG. 13 shows the components and mechanical disposition of the Infiniband interface ports for a semi-subrack;

FIG. 14 shows schematically a network structure with a fat tree topology;

Figure 1:
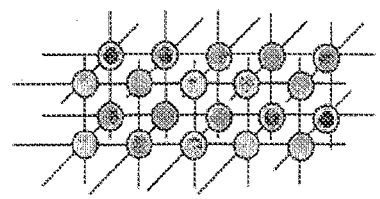
FIG. 1 is a schematic representation of a generic three-dimensional interconnection.
Figure 2:
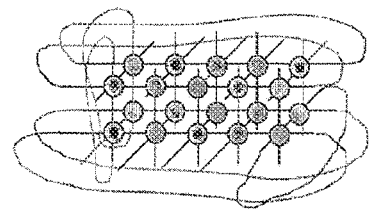
FIG. 2 is a schematic representation of a generic three-dimensional interconnection with some connections closed toroidally.
Figure 4:
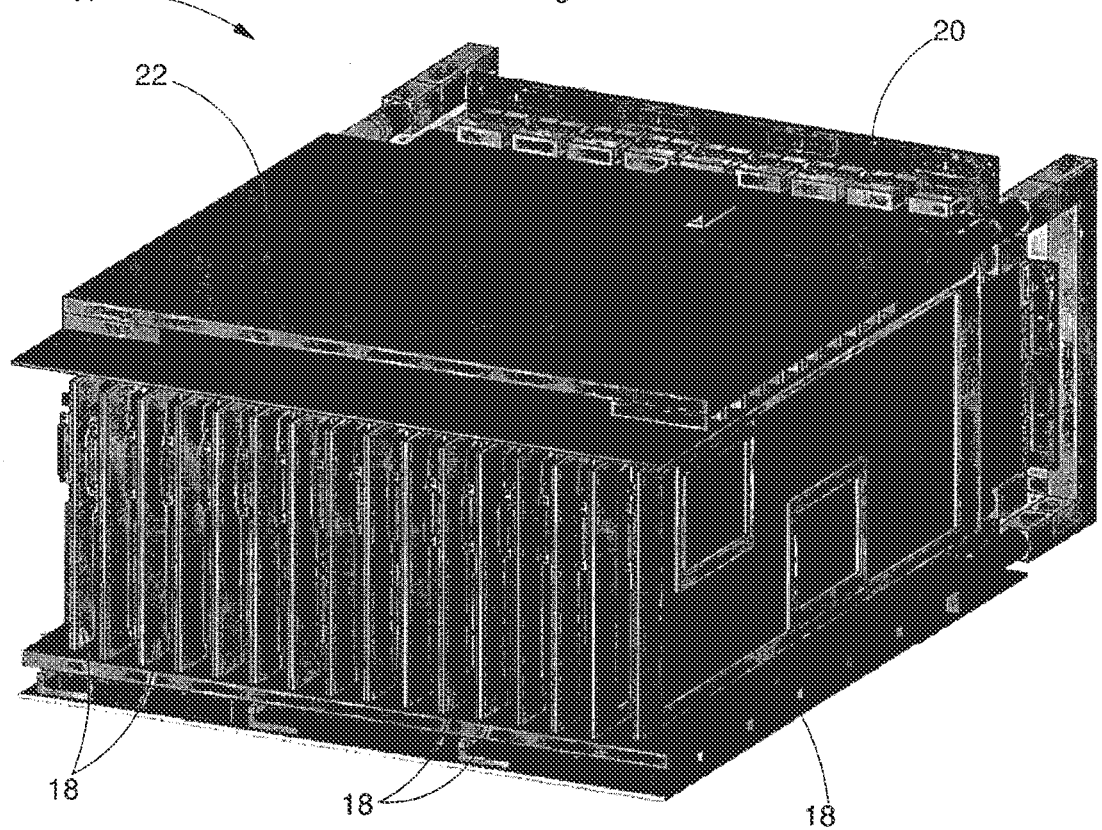
FIG. 4 is a schematic representation of a semi-subrack of the architecture according to the present invention, including node cards, root cards, backplanes.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF A PREFERENTIAL FORM OF EMBODIMENT

With reference to the attached drawings, an architecture 10 is described of a unified network for scalable super-calculus systems on the level of computational capacity of more than 1 PetaFlops, hereafter denominated Unified Net-interconnect Architecture—UNA, to execute a super-calculus processing application.

Figure 3:
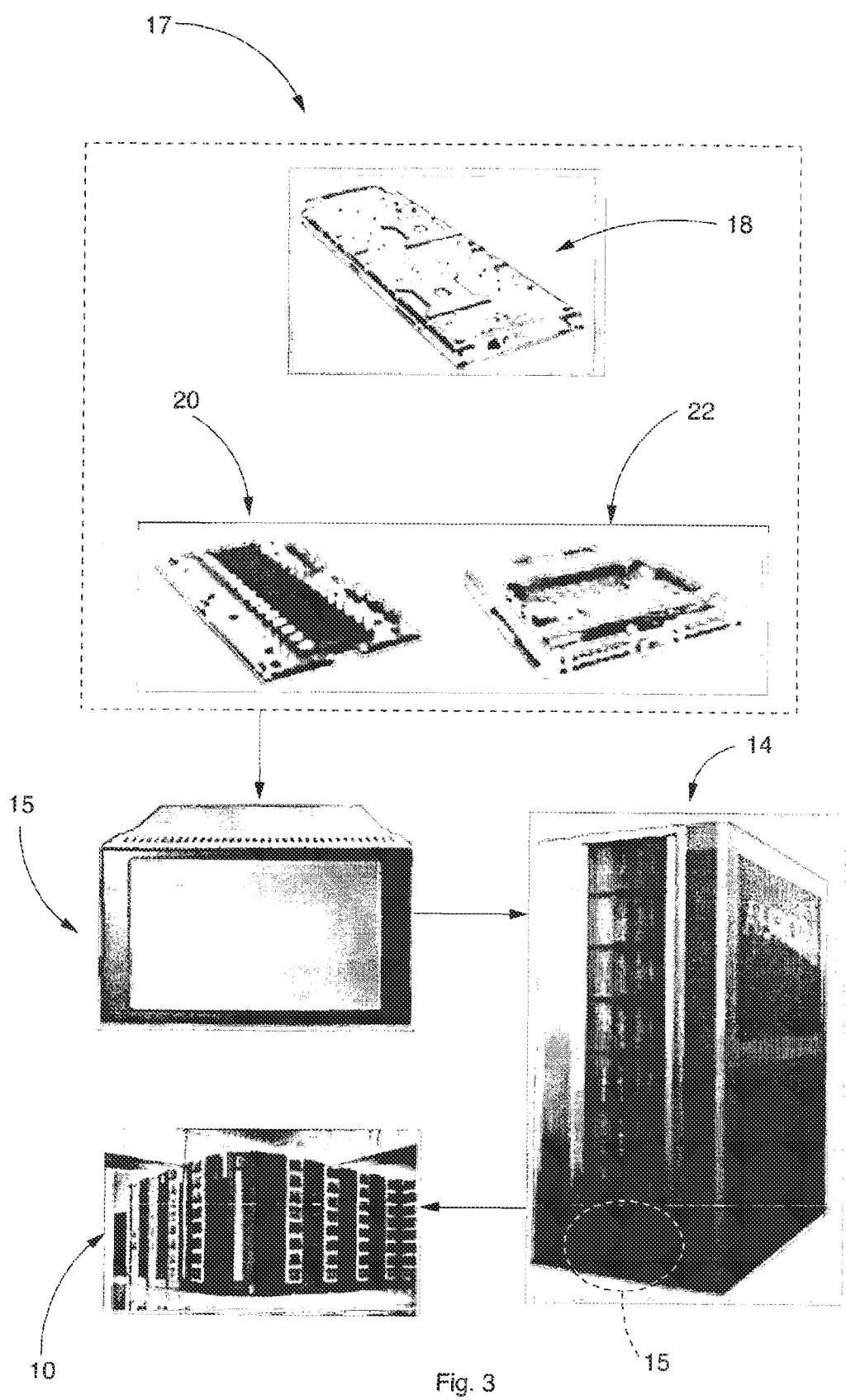
FIG. 3 is a schematic representation of the components that make up a supercomputer that uses the architecture according to the present invention.
Figure 5:
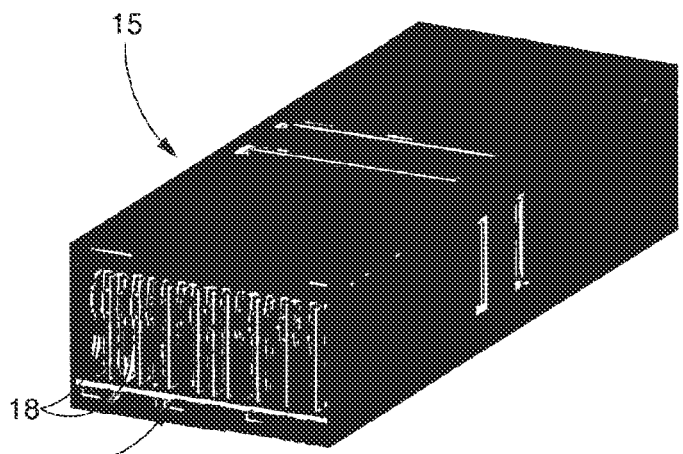
FIG. 5 is a schematic representation of a subrack for the architecture according to the present invention.
Figure 6:
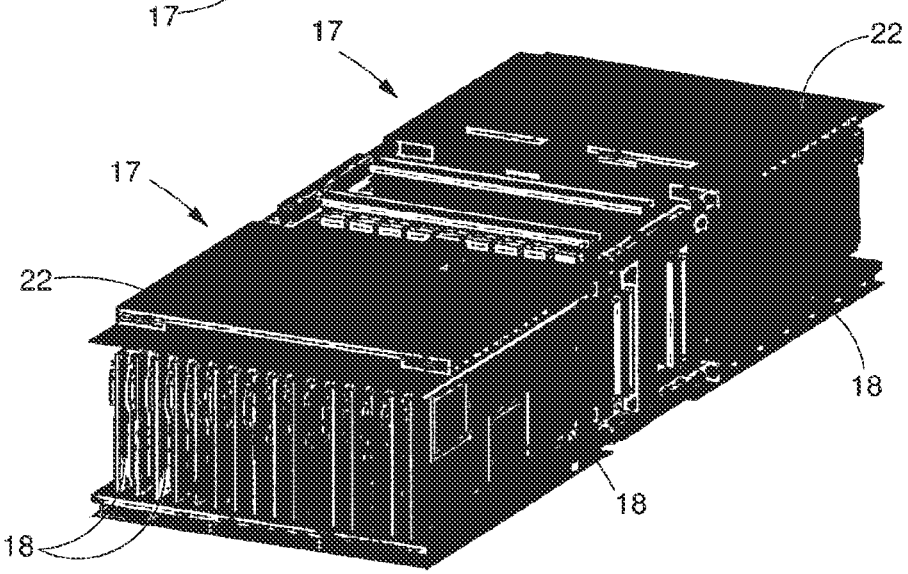
FIG. 6 is a schematic representation of a pair of semi-subracks for the architecture according to the present invention.

The architecture 10 (FIG. 3) achieves a system of communication between calculus units or nodes of a supercomputer. Typically, a supercomputer comprises one or more racks 14, or between several mechanical support structures for several subracks, also called chassis, 15 (FIG. 5). Each rack 14 also houses a liquid cooling system, the feed cables and communication cables, not shown.

Each subrack 15 comprises two modular structures, or semi-subracks 17 (FIGS. 3, 4, 5 and 6), disposed in a front-rear position.

Figure 7:
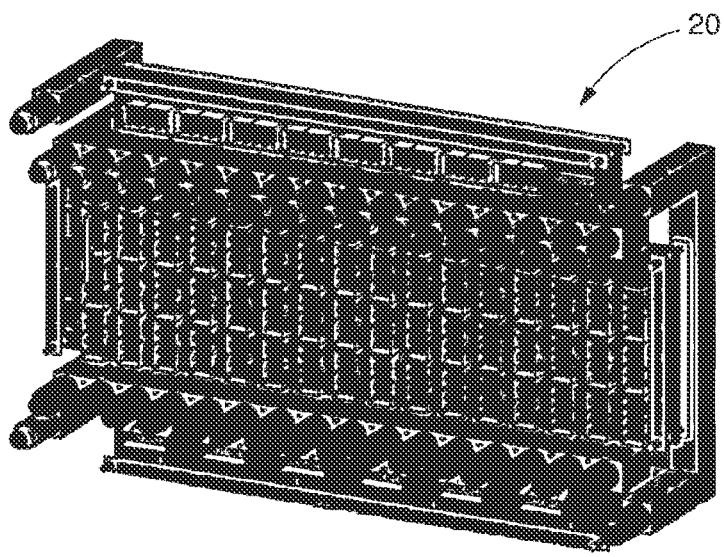
FIG. 7 is a schematic representation of a backplane for the architecture according to the present invention.

Each semi-subrack 17 comprises:

a plurality of calculus units or nodes 18 defined by node cards, which represent the basic components which implement the calculus and network functions relating to a node of the architecture, wherein the overall processing required by the application is mapped on a determinate partition of the nodes and distributed in coordinated manner to the individual nodes, each of which is configured to execute a process or sub-set of operations required by the application;

a backplane 20 (FIGS. 7 and 9) with the main function of interconnection and electronic and mechanical communication between the nodes 18 associated with the node cards and toward the other semi-subracks 17 of the system;

a root card 22, which manages feed and provides to monitor and distribute synchronization information on the level of the semi-subrack 17 and toward the other semi-subracks 17 of the system, and a master root card 24 for each rack 14.

The architecture 10 according to the present invention, as will be described in more detail hereafter, allows to obtain a scalable system, for example:

100 GigaFLOPS/node

24 TeraFLOPS/rack (sixteen nodes for sixteen subracks;

1 PetaFLOPS in 42 racks.

Therefore, a specific installation can scale by a factor of greatness 1000 passing from 10 nodes to nearly 11000 nodes and therefore, given that a node comprises 2 calculus units each consisting of from 4 to 6 cores (according to the computation device used), the number of overall processing cores for 1 PetaFLOPS is about 86000. From these numbers it is clear how the need for an efficient dedicated synchronization system is important as the sizes of the system increase.

In some embodiments, the architecture 10 according to the present invention provides:

an internodal communication architecture, configured to receive data and information to be processed at input to said nodes and for transmission at output to one or more other nodes that belong to the mapped application on the desired partition of the modular structure, of output data relating to the results of the processing, so as to at least distribute the processing between several nodes, to effect different processing tasks substantially simultaneously and to share the relative results among several nodes; the communication architecture comprises an internodal data communication network, in some embodiments, of the one/two/three-dimensional type with a node-to-node connection to the first nearest, bidirectional, or connections independent one for direction, low latency, closed toroidally, and a node communication network of the switched fabric fat tree type;

a synchronization architecture comprising three synchronization networks supporting the topology as per the previous point:

i) a relatively slow one but with a limited protocol load;
ii) a fast one without protocol;
iii) a fast one "to the first nearest";

reconfigurability of the topology in sub-topologies (partitions) having the same characteristics as the main one (low latency, connection to the first nearest, further partitionability, etc.) without physical intervention on the machine (without needing to modify hardware or cables, etc.);

adaptation of the synchronization network according to the sub-topologies created under the previous point.

Figure 8:
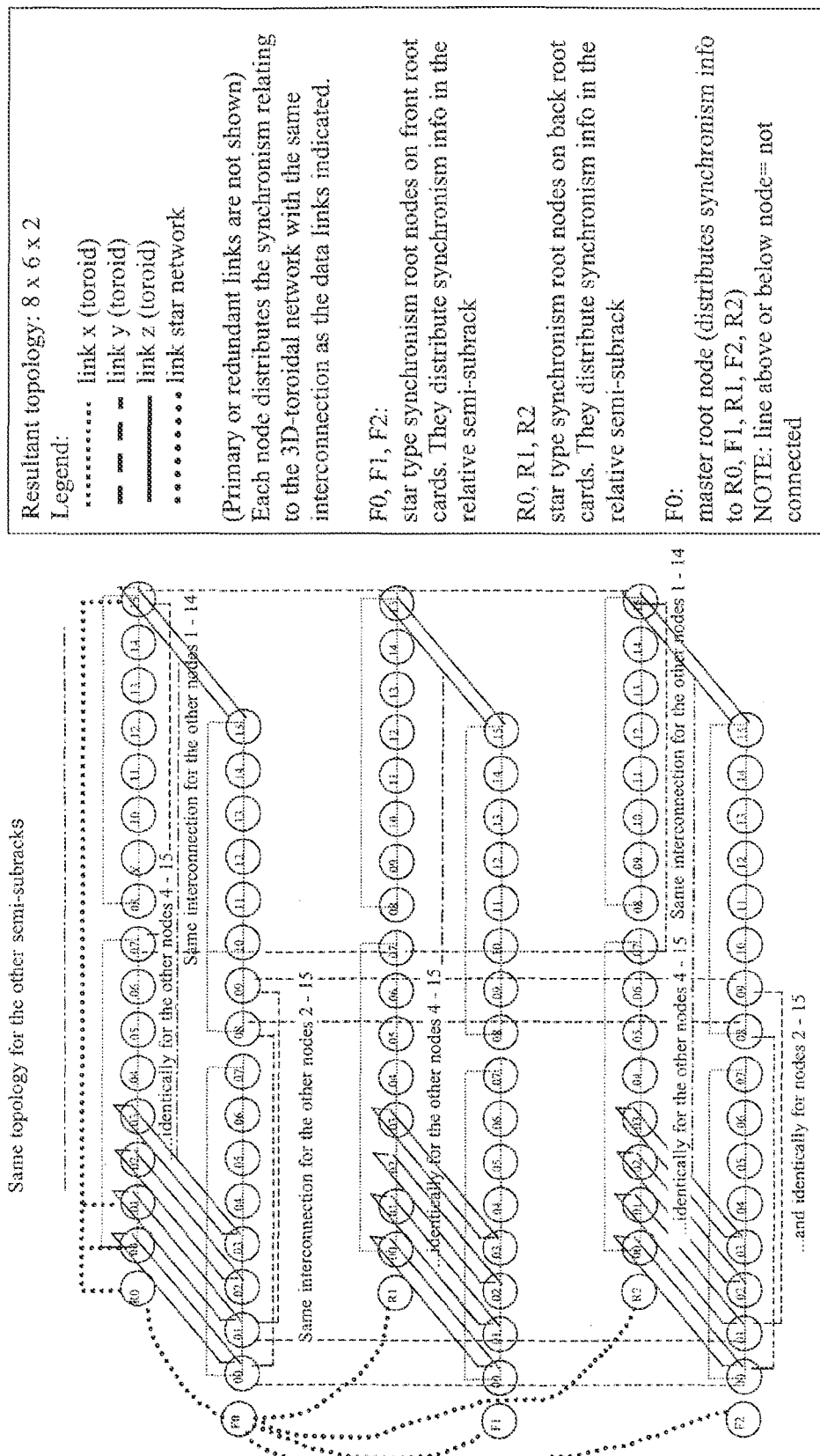
FIG. 8 is a schematic representation of a 3D toroidal topology on system partition consisting of 6 semi-subracks (three front and three back, corresponding to 3 subracks)

FIG. 8 shows an example of a 3D toroidal topology on a system partition consisting of three subracks (consisting of six semi-subracks 17, three frontal and the three corresponding rear ones).

In some embodiments, the architecture 10 according to the present invention comprises the following macro-components:

i) data and information communication architecture between the nodes 18 comprising a 3D-Toroidal network (network Mesh 2D or 3D with toroidal closing) for node-to-node communication to the first nearest, wide band (60 Gbps overall) and low latency, less than 1 microsecond from memory to memory of two nodes, and a switched network fabric fat tree node communication network, obtained in some embodiments with standard QDR 4× Infiniband communication, hereafter IB, wide band (40 Gbps per node) and low latency, less than about 2 microseconds;

ii) synchronization architecture that provides a plurality of synchronization networks, in particular three distinct hardware networks dedicated to specific synchronization communications and in particular:

ii.a) a specific serial node-to-node network for 3D-Toroidal network synchronization;
ii.b) a fast sync global network for synchronization information of the whole system or specific partition;
ii.c) a "Slow Complex Sync" network for complex synchronizations and other non-computational traffic for CPU offloading;
iii) Programmable Network Processor NWP (FPGA device) which is configured to achieve every calculus node:
iii.a) 3D-toroid network interface;
iii.b) synchronization networks interfaces, in particular three synchronization networks;
iii.c) management of the selection/configuration of the partitioning of the system;
iii.d) implementing the calculus operations necessary for processing the data in transit on the synchronization networks so as to reduce the network traffic and the latency.

Figure 10:
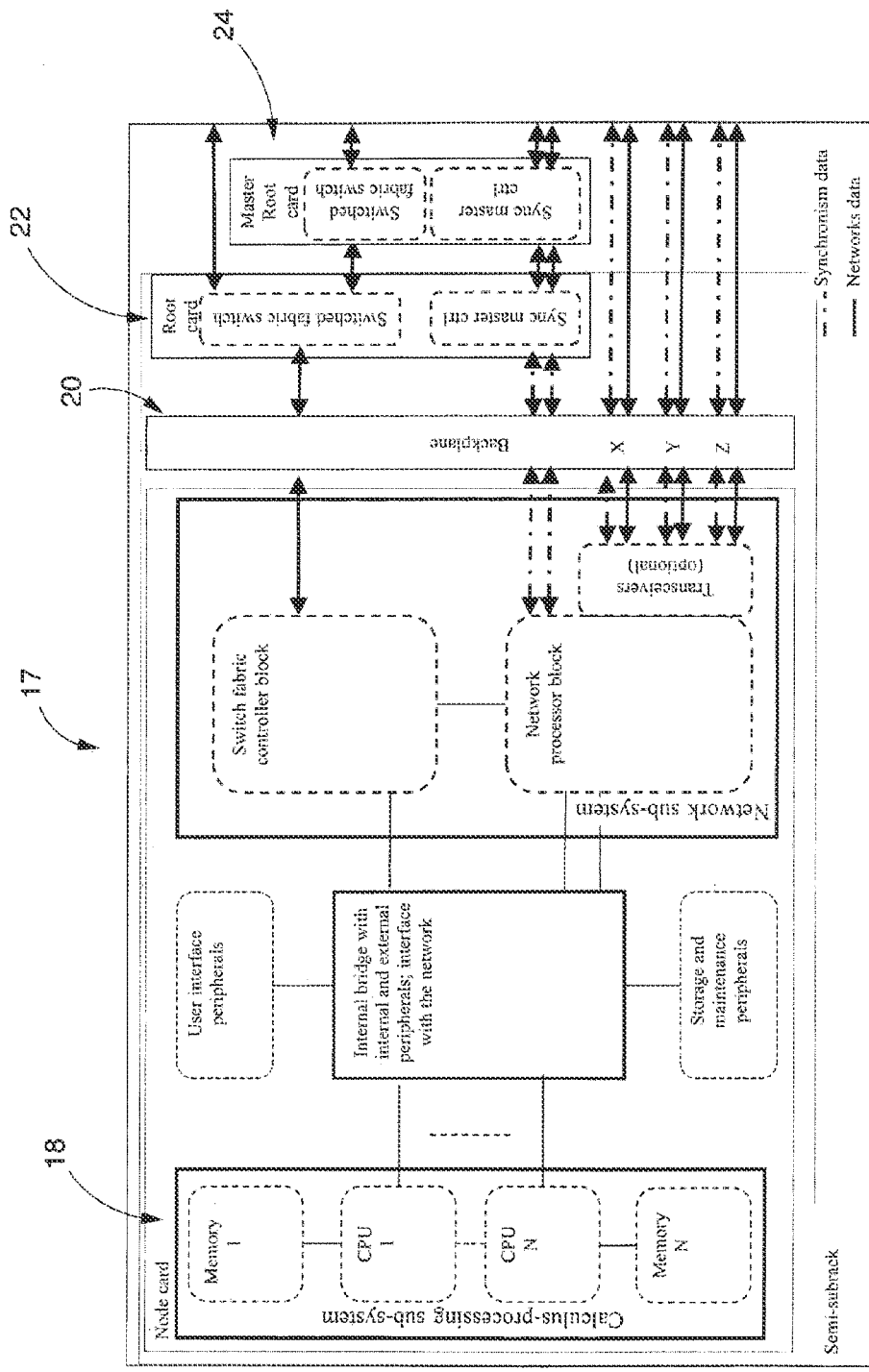
FIG. 10 is a block diagram of the node architecture according to the present invention.

FIG. 10 shows a block diagram of the architecture according to the present invention as described above, which shows, in the semi-subrack 17, the node 18 defined by the node card, the backplane 20, the root card 22, the master root card 24, and which shows the stream of synchronization data managed by the synchronization architecture as above, and the stream of data and information between the calculus nodes of the 3D-toroidal communication network and the switched network fabric fat tree node communication network.

Since all the synchronization networks (and the 3D-toroidal network) are implemented and managed by the NWP, they can be used independently or collaboratively (exploiting the knowledge of overall synchronization information pertaining to the node) according to the needs or operating step of the algorithm being executed, in order to optimize the synchronization on all levels.

Communication Architecture
3D-Toroidal Network
Data Communication Details

The data communication network is based on a high-performance FPGA type device with integrated serial transceivers on high-speed differential lines (able to pilot high-speed differential lines and for distances in the range of a couple of meters), located on board the calculus nodes or alternatively an FPGA equipped with external high-speed serializators/deserializators (transceivers) having characteristics able to improve the integrity signal along the transmission lines (pre-emphasis/equalization).

The differential lines in question are distributed from one node 18 to the other through appropriate paths on the level of the backplane 20 (reached by connectors inside the semi-subrack) or via backplane and backplane-to-backplane cables (passages always effected through external interface connectors for semi-subracks). In this way the nodes 18 are connected to each other, creating a three-dimensional topology, and in the same way, the toroidal closure in the three directions (which for the sake of convenience we will call X, Y and Z).

Each of the bidirectional node-to-node interconnections is formed by two independent sub-connections, one for each direction or by a bidirectional connection (FIG. 11).

One particularity of the three-dimensional network proposed here is that it has an alternative communication, in this specific case exclusive, for each of the directions and for each of the senses.

This is the basis for the flexibility and reconfigurability in partitions. We will indicate by R this other series of links or connections (FIG. 12).

It should be noted that the alternative link or connection R is direct for each of the directions to a node different from that sighted by the respective primary link or connection. Therefore the primary link or connection X+ leads to one node, whereas the alternative one XR+ leads to a different node.

Through suitable software commands and by means of the FPGA, it is possible to indicate that the data must be transmitted, for example, on an XR+ channel instead of X+, or for example, that the data will be received by XR+ instead of X+, etc.

The physical connections to be achieved with X+, X−, XR+, XR−, Y+, Y−, YR+, YR−, Z+, Z−, ZR+, ZR− are chosen so as to guarantee the best and most flexible possible partitioning into three-dimensional sub-topologies each of which is closed toroidally.

It should be noted that every node slot 18 (and therefore every node) inside the backplane 20 is univocally defined by a fixed hardware address (0.1, . . . 15) and in turn each backplane 20 is identified by a univocal hardware address (0, 1, 2 . . . ): this means that every calculus unit inside the supercomputer is univocally identifiable through the coordinate:

(address_hw_backplane, address_hw_slot).

The directions X, Y and Z that indicate the connections of each individual node refer in general to the following connections (for non-redundant links or connections):
X: direction involving nodes on the same backplane
Y: direction involving nodes in vertically adjacent subracks
Z: direction involving nodes 18 in adjacent racks 14 (the rear semi-subrack can be considered a rear rack).

On the contrary, for redundant links or connections, the following connections generally apply:
XR: alternative nodes with link or connection along X but relating to the same backplane;
YR: alternative nodes with link or connection along Y, again intra-backplane;
ZR: alternative nodes with link or connection along Z, between backplane in front of the rear one in back-to-back semi-subrack configuration (and therefore as if between two different racks).

In some specific embodiments of the present invention, each link or connection of the 3D-toroidal network is implemented with:
custom LVDS differential serial interface;
four mono-directional lanes each of 2.5 Gbps (10 Gbps per direction);
two directions (full duplex).

The 3D-toroid network interface is made by the NWPs (and possibly specific transceivers if not integrated in NWPs) on the individual node cards of the nodes 18, with the interconnections on backplane and external cabling.

EXAMPLE

Topology for Single Subrack

According to one embodiment, a supercomputer is considered represented by a container for electronics (rack 14), having eight sub-containers (subracks 15), divided into sixteen semi-subracks, of which eight are located in front of the rack 14 and eight are located behind the rack 14, near the first 8, in a specular spatial configuration. It is also hypothesized that a semi-subrack houses sixteen calculus nodes 18 interconnected to each other by a backplane 20 and that on the backplane 20 of each semi-subrack there are connectors able to transport the data lines from one backplane to those immediately nearest, therefore, in this specific case, the one that is on the back at the same height, the one that is immediately above (if present), the one that is immediately below (if present), the one that is immediately to the right in a possible adjacent rack, and, in the same way, the one immediately on the left.

To simplify display, the explanation is done with regard to a single backplane.

Figure 9:
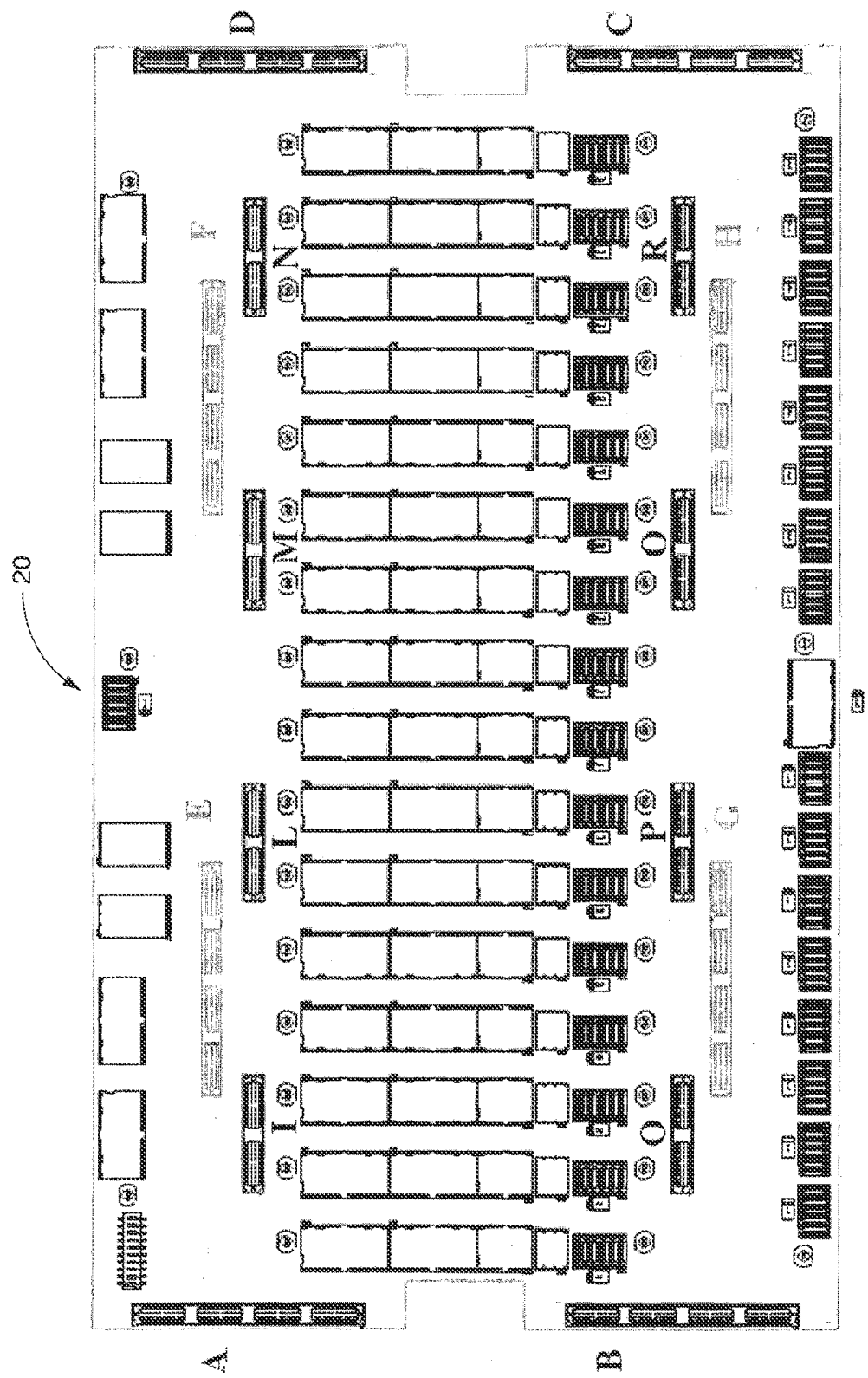
FIG. 9 is a schematic representation of a backplane for interconnection of sixteen calculus nodes of a semi-subrack.

FIG. 9 shows 16 slots for the insertion of the calculus nodes 18 and the connectors toward the cables (indicated with letters and intended for the extension of the topology outside the backplane 20). Please note that the connectors I, L, M, N, O, P, Q, R, E, F, G, H are located on the back of the backplane 20 and are seen here transparent.

In this specific case, the system architecture allows to generate a three-dimensional topology closed toroidally and, in the same way, to generate via software commands many sub-topologies (in practice, to reduce the supercomputer to several smaller supercomputers). Summarizing, on the level of single semi-subrack the invention allows to manage sub-topologies of the type: 16×1×1 (one), 8×1×1 (up to 2), 8×2×1 (one), 4×1×1 (up to 4), 4×2×1 (up to 2), 2×1×1 (up to 8), 2×2×1 (up to 4).

Obviously, the topology discussed as an example can be extended to the subrack (2 semi-subracks), to the topology between several subracks, to the whole rack, and to several racks.

Fat Tree Switched Network Fabric

This communication network has a fat tree topology for the communication of data and information between the calculus nodes, obtained with a standard Infiniband QDR network.

Each node houses an Infiniband (IB) controller with overall maximum band of about 40 Gbps.

Each root card comprises a QDR IB (Infiniband) switch with 34 ports of which:

16 internal IB ports, indicated with the reference number 26, connected to 16 IB ports of node cards (relative to a single semi-subrack 17);

20 external IB ports, indicated with the reference number 28, offered on external connectors for connections outside the semi-subrack 17.

FIG. 13 shows the positioning of the Infiniband network interface connectors 26, 28 in a semi-subrack 17.

The structure called "fat tree" is obtained with a tree graph having branches of different thickness, in particular growing passing from the leaves toward the root (FIG. 14). This corresponds to having connections with a bigger band width (for example multiple of a low value).

With reference to one embodiment of the present invention, on the level of semi-subrack 17, the connection between every node 18 and the integrated IB switch is fixed and obtained with a single Infiniband channel. Therefore, on this level (leaf level), it is not possible to achieve links or connections with parallel multiple channels. Otherwise, considering the connections between different semi-subrack switches and switches relating to other racks (which obtain the upper levels of the tree) it is possible to dedicate several ports to the connection between two switches, in practice obtaining a multiplication of the band available and hence achieving a "fat" connection with a greater band amplitude.

Synchronization Architecture

As mentioned above, the whole synchronization architecture, and hence its topology, comprises a plurality, in this case three, synchronization networks having the following characteristics:

i) a relatively slow network but with a limited protocol load (star type), hereafter called Slow Complex Sync ii) a fast network, without protocol (star type), hereafter called Fast Sync Global;

iii) a fast network with low latency with connection to the first nearest, hereafter called Serial node-to-node.

Serial Node-To-Node Synchronization Network

The serial node-to-node synchronization network is used for synchronization information for the 3D toroidal network to the first nearest nodes.

Its structure and communication mode is the same as the 3D toroid network: for every node there are 6 links or connections (differential serial LVDS) and 6 redundant links or connections, each of which made with 2 mono-directional links or connections, or with 1 bidirectional link.

In some embodiments, the Serial node-to-node synchronization network for example is implemented as an LVDS lane from 1 Gbps raw bidirectional with about 450 nanoseconds of minimum latency.

Thanks to this structure of interconnections for every node, in the event of partitioning of the 3D toroidal network, the relative synchronization network also follows the same partitioning.

The nodes of the network are implemented in the Programmable Network Processor that supplies possible hardware support to accelerate the operations on the messages in transit in the node.

Fast Sync Global Synchronization Network

The Fast Sync Global synchronization network is used for minimum latency global synchronization information for the whole system (or partition) such as interrupt, events, global clock, etc.

The network has a tree-like topology: star type on the level of the semi-subrack and individual rack; daisy chain connection between several racks, which ensures easy addition of other racks.

Figure 16:
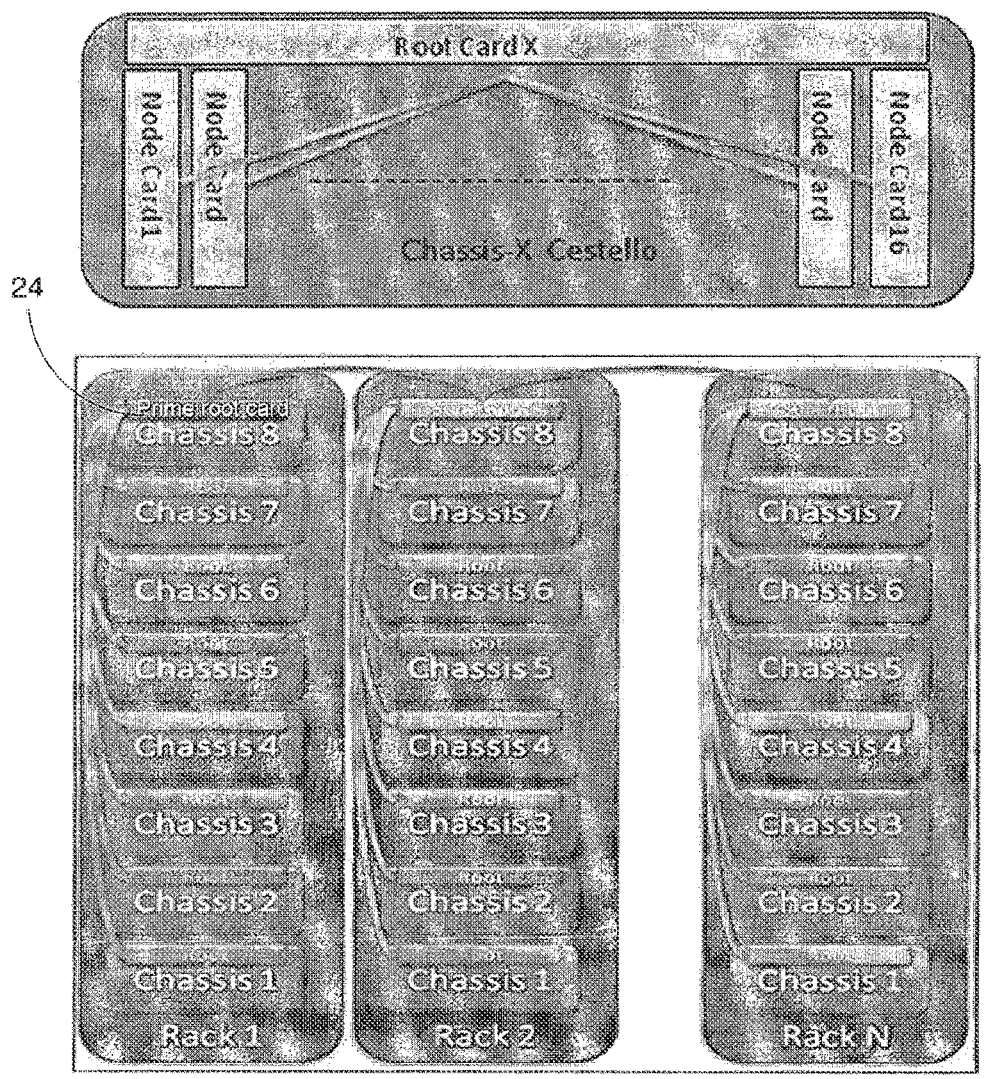
FIG. 16 shows schematically a communication topology for Fast Sync Network and SPI Slow Sync Network, in which the connections can be seen for semi-subracks (at the top), inside racks and between racks (at the bottom).

In the daisy chain connection between the root cards 22 of the racks 14, one takes the role of master (called prime or master root card, indicated by the reference number 24 in FIG. 16) in the hierarchy of the network to coordinate the distribution of the synchronization information.

The nodes of the network are implemented in the Programmable Network Processor and on root cards with a specific component (typically made with an FPGA programmable logic component) able to distribute the synchronization data in the relative star type sub-network.

The network does not provide any specific protocol for the messages for maximum speed and minimum latency.

An example of implementation according to the present invention is with two serial LVDS lanes 2 bit @ 100 Mbps per lane, per direction.

Slow Complex Sync Synchronization Network

The Slow Complex Sync synchronization network is used for more complex synchronization information compared with that in transit on the Fast Sync Global network (more structured synchronization messages), intended for the whole system or partitions (virtual channels) to support more complex primitive Collectives or for offloading (from the CPUs) the management of communication protocols for SAN devices (for storage), for monitoring, jobs management. The topology of the network is the same topology as the Fast Sync Global network. In some embodiments for Aurora systems the electric interface is SPI standard. In particular, for communication between semi-subracks and between racks the individual signals are achieved with LVDS differential serial connections at speeds of about 25 MHz. The data protocol is standard type usable for SPI electric interface.

FIG. 16 shows the implementation of the tree-like communication topology used for Fast Sync Network and SPI Slow Sync Network—connections for semi-subracks (at the top), inside the rack and between racks (at the bottom).

Each node reached by the star type synchronization networks is identifiable univocally via hardware from the coordinates:

(address_hw_backplane, address_hw_slot)

Figure 15:
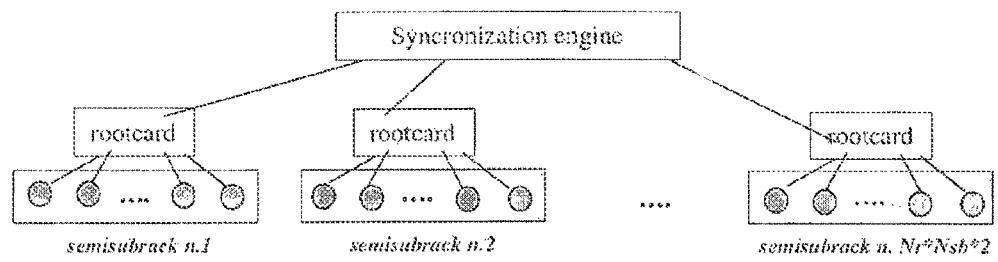
FIG. 15 shows schematically a star type topology for a synchronization network in relation to the structure of the system.

Given the star type distribution of the synchronization network and the presence of a univocal hardware address for each backplane and node card, it can be asserted that the network is partitionable identically to the sub-topologies created on that data network. Therefore it is possible to synchronize the nodes present in a single sub-topology independently of the others (FIG. 15). The same result is obviously applied for the synchronization to the first nearest, since the relative synchronization network naturally follows the topology of the n-toroidal data interconnections achieved.

Programmable Network Processor

The Programmable Network Processor (NWP) according to the present invention is a reconfigurable device that implements the nodes both of the n-toroidal network and also of the synchronization networks. By means of the NWP it is possible to implement the calculus operations necessary for processing the data in transit on the networks of the synchronization architecture in order to reduce network traffic and latency. The Programmable Network Processor is also configurable in real-time, during the execution of an application, to obtain a particular partitioning of the system at a certain instant.

In some embodiments, the NWP is an integrated digital circuit whose function is programmable via software (FPGA, Field Programmable Gate Array). Such circuits have intermediate properties compared with ASIC (Application Specific Integrated Circuit) devices on the one hand, and those with PAL (Programmable Array Logic) architecture on the other hand. Using FPGA devices has the advantage, compared with ASIC devices, that they allow the final user to program them directly, and to make amendments or corrections simply by reprogramming the FPGA device at any moment. On the contrary, in ASIC devices, the function to be implemented is set by the producer and therefore they have high costs and design times, and require verification through simulations and testing in the field of application.

The invention claimed is:

1. Network architecture for communication between elementary calculus units or nodes of a supercomputer in order to execute a super-calculus processing application, partitionable and scalable at the level of calculus power in the range of PetaFLOPS, said supercomputer comprising a plurality of modular structures, each of which comprises:

a plurality of elementary calculus units or nodes defined by node cards, which represent the basic components which implement the calculus and network functions relating to a calculus unit or node of the architecture, wherein the overall processing required by the application is mapped on a determinate partition of said nodes and distributed in coordinated manner to said individual nodes, each of which is configured to execute a process or sub-set of operations required by the application;

a backplane both of interconnection between said nodes of the modular structure and also of communication of said nodes with the other modular structures;

a root card, which manages feed and provides to monitor and distribute synchronization information both between the nodes interconnected by the relative backplane and also toward the other modular structures;

wherein the network architecture includes i) an internodal communication architecture, configured to receive data and information to be processed at input to said nodes and for transmission at output, to one or more other nodes that belong to the mapped application on the desired partition of the modular structure, of output data relating to the results of the processing, so as to at least distribute the processing between several nodes, to effect different processing tasks substantially simultaneously and to share the relative results among several nodes, said communication architecture comprising a node communication network of the n-toroidal type and a node communication network of the switched fabric fat tree type;

ii) a synchronization architecture comprising a plurality of distinct node communication networks, configured for the communication of specific synchronization information different from network to network and with different characteristics;

iii) a re-configurable Programmable Network Processor that implements the nodes both of the n-toroidal network and those of the synchronization networks;

wherein said node communication networks of the n-toroidal type and of the switched fabric fat tree type can be used alternately or simultaneously for the transmission between the calculus nodes of the same type of data and information also in a configuration of system partitions in order to achieve the desired interconnection topology of the nodes;

said synchronization networks can be used independently or collaboratively for every topology and partitioning of the system;

said Programmable Network Processor of each node is suitable to implement the calculus operations necessary to process the data in transit on the synchronization architecture networks in order to reduce the network traffic and the latency, said Programmable Network Processor being configurable even in real time, during the execution of an application, in order to achieve a particular system partitioning at a certain instant.

2. Architecture as in claim 1, wherein said node communication network of the n-toroidal type is a 3D-Toroidal network, for communication to its first nearest nodes, on broad band and low latency.

3. Architecture as in claim 1, wherein said node communication network of the n-toroidal type is based on a high performance FPGA device, suitable to pilot high-speed differential lines and for distances of about two meters, placed on board the calculus nodes or alternately on an FPGA device equipped with external high-speed serializators/de-serializators and suitable to improve the signal integrity along the transmission lines.

4. Architecture as in claim 3, wherein said differential lines are distributed by one node to another by means of routes at backplane level or via backplane and backplane-to-backplane cables connecting the nodes with each other, creating the three-dimensional topology and the toroidal closing in the three different directions (X,Y,Z), in which each of the node-to-node interconnections is formed by two independent sub-connections one for each direction, or by one bi-directional connection, having an alternate communication of the exclusive type for each of the directions and for each of the senses.

5. Architecture as in claim 1, wherein said node communication network of the switched fabric fat tree type is formed by root cards and relative node cards which define the calculus nodes, wherein each node card hosts an Infiniband (IB) controller and each root card comprises a QDR IB switch.

6. Architecture as in claim 1, wherein said synchronization architecture comprises three distinct hardware networks dedicated to specific synchronization communications comprising:
- iii.a) a specific serial node-to-node network for the n-toroidal network synchronization, for the synchronization information for the n-toroidal network to the first nearest nodes;
- iii.b) a "fast sync global" network for synchronization information of the whole system or of specific partition at minimum latency such as interrupt, events, global clock and suchlike;
- iii.c) a "Slow Complex Sync" network for complex synchronizations and other traffic not able to be computerized for CPU offloading.

7. Architecture as in claim 6, wherein the structure and communication of the serial node-to-node synchronization network is the same as the node communication network of the n-toroidal type, for every node there being present 6 links or connections and 6 redundant links or connections, each of which is made with 2 mono-directional links or connections, or with 1 bi-directional link or connection.

8. Architecture as in claim 7, wherein the topology of the serial node-to-node synchronization network is the same as that of the n-toroidal type node communication network for any partitioning of the system achieved.

9. Architecture as in claim 6, wherein said "fast sync global" network has star type tree-like topology on a semi-subrack and single rack (14) level with daisy-chain connection between several racks.

10. Architecture as in claim 8, wherein the nodes of the "fast sync global" network are implemented in the Programmable Network Processor and on root cards with specific component able to distribute the synchronization data in the relative star type sub-network.

11. Architecture as in claim 6, wherein the topology of said "Slow Complex Sync" network is the same as the "fast sync global" network, comprising an electric interface of the standard SPI type.

12. Architecture as in claim 1, wherein said Programmable Network Processor is configured to achieve for each calculus node:
- iv.a) a 3D-toroidal network interface;
- iv.b) interfaces of three synchronization networks;
- iv.c) management of the selection/configuration of the partitioning of the system,
- iv.d) implementation of the calculus operations necessary to process the data in transit on the synchronization networks in order to reduce the network traffic and the latency.

13. Method to make a network architecture for communication between elementary calculus units or nodes of a super-computer in order to execute a super-calculus processing application, partitionable and scalable at the level of calculus power in the range of PetaFLOPS, wherein the overall processing required by the application is mapped on a determinate partition of said nodes and distributed in coordinated manner to said individual nodes, each of which is configured to execute a process or sub-set of operations required by the application, the method comprising:
- i) receiving, by means of a node communication network of the n-toroidal type and/or a node communication network of the switched fabric fat tree type, data and information to be processed at input to said nodes and for transmission at output to one or more other nodes that belong to the mapped application on the desired partition of the modular structure, of output data relating to the results of the processing, so as to at least distribute the processing between several nodes, to effect different processing tasks substantially simultaneously and to share the relative results among several nodes,
- ii) communicating specific synchronization information by means of a synchronization architecture comprising a plurality of distinct node communication networks, wherein different synchronization information having different specific characteristics from network to network uses said synchronization networks and is suitably mapped on a selected and suitable one of said synchronization networks;
- iii) implementing the nodes both of the n-toroidal network and of the synchronization networks by means of a reconfigurable Programmable Network Processor;

wherein:
- said node communication networks of the n-toroidal type and of the switched fabric fat tree type are used alternately or simultaneously for the transmission of data and information between the calculus nodes of the same type also in a configuration of system partitions in order to achieve the interconnection topology of the nodes;
- said synchronization networks are used independently or collaboratively for every topology and partitioning of the system;
- said Programmable Network Processor of each node implements the calculus operations necessary to process the data in transit on the synchronization architecture networks in order to reduce the network traffic and the latency, and also said Programmable Network Processor is configurable even in real time, during the execution of an application, in order to achieve a particular system partitioning at a certain instant.

* * * * *